(12) United States Patent
Prehofer

(10) Patent No.: US 6,958,974 B1
(45) Date of Patent: Oct. 25, 2005

(54) METHOD FOR PROVIDING A STABLE QUALITY OF DATA SERVICES WITHIN A PACKET-SWITCHING NETWORK

(75) Inventor: Christian Prehofer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/868,086

(22) PCT Filed: Dec. 1, 1999

(86) PCT No.: PCT/DE99/03851

§ 371 (c)(1),
(2), (4) Date: Jun. 14, 2001

(87) PCT Pub. No.: WO00/36792

PCT Pub. Date: Jun. 22, 2000

(30) Foreign Application Priority Data

Dec. 15, 1998 (DE) ................................ 198 57 822

(51) Int. Cl.[7] .......................... H04L 12/28; H04L 12/56
(52) U.S. Cl. ...................... 370/235; 370/352; 370/401; 370/468; 709/232; 709/240
(58) Field of Search ................................ 370/230, 231, 370/235, 468, 428, 252, 253, 400, 401, 389, 370/392, 395.43; 709/232, 240, 238, 234, 709/235, 236, 241, 223

(56) References Cited

U.S. PATENT DOCUMENTS

| | | | |
|---|---|---|---|
| 5,940,372 A | * | 8/1999 | Bertin et al. ................. 370/238 |
| 6,014,384 A | * | 1/2000 | Weberhofer ............. 370/395.43 |
| 6,078,953 A | * | 6/2000 | Vaid et al. ................... 709/223 |
| 6,286,052 B1 | * | 9/2001 | McCloghrie et al. ........ 709/238 |
| 6,308,216 B1 | * | 10/2001 | Goldszmidt et al. ......... 709/236 |
| 6,678,248 B1 | * | 1/2004 | Haddock et al. ............. 370/235 |

FOREIGN PATENT DOCUMENTS

| | | |
|---|---|---|
| EP | 0 790 725 A2 | 8/1997 |
| WO | WO 98/28938 | 7/1998 |

OTHER PUBLICATIONS

"Dynamic QoS control of multimedia applications baed on RTP", Busse et al., Computer Communications, vol. 19, No. 1, pp. 49-58.

"SRP: A Scalable Resource Reservation Protocol for the Internet", Almesberger et al., Computer Communications, vol. 21, No. 4, pp. 1200-1211.

Dynamic Connection Management for Call-Level QoS Guarantee in Integrated Communication Networks, Lee et al.; 1994, pp. 1073-1082.

(Continued)

*Primary Examiner*—Frank Duong
*Assistant Examiner*—Jay P. Patel
(74) *Attorney, Agent, or Firm*—Bell, Boyd & Lloyd LLC

(57) ABSTRACT

In a packet-switching network, a stable quality grade is achieved for data services by virtue of the fact that, during the transmission of data packets which are associated with a data service and are assigned to a quality class for the purposes of possible preferential treatment, the transmitter, generally a computer of a service provider, and/or at least one intermediate node establishes the quality of the transmission on the basis of acknowledgements indicating the quality grade and compares it with the quality grade demanded by the data service, and, on the basis of the result of the comparison, the data packets associated with the data service are possibly assigned to another quality class, of which the quality grade demanded by the data service is expected.

7 Claims, 1 Drawing Sheet

OTHER PUBLICATIONS

Internet Draft Document "Differentiated Services Model and Definitions" Nichols, Feb. 1998.

Internet Draft Document "An Architecture for Differentiated Services", Blake et al., May 1998.

Internet Draft Document "A Framework for Differentiated Services", Bernet et al., Oct. 1998.

"Dynamic QoS Control of Multimedia Applications based on RTP". Buss et al, Jun. 1995.

* cited by examiner

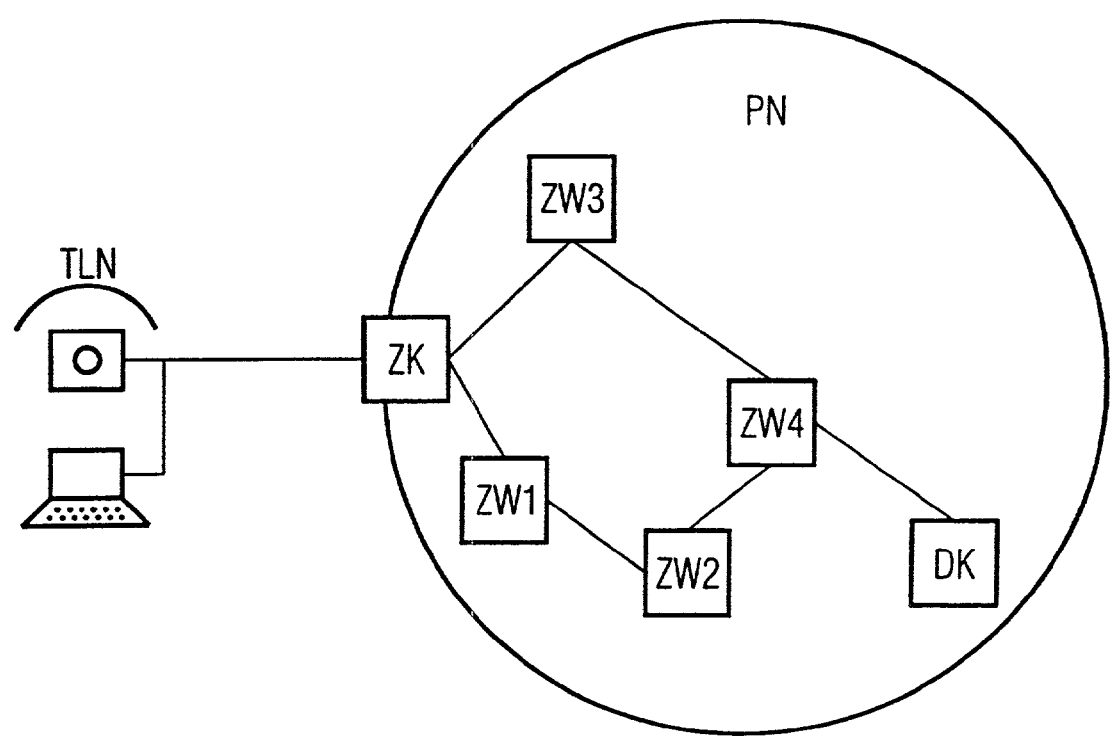

METHOD FOR PROVIDING A STABLE QUALITY OF DATA SERVICES WITHIN A PACKET-SWITCHING NETWORK

BACKGROUND OF THE INVENTION

1. Field of the Invention

The present invention relates, generally, to a method for providing a stable quality grade for data services within a packet-switching network and, more specifically, to such a method wherein a quality grade of a transmission is compared with a quality grade demanded by a data service and, depending on a result of the comparison, data packets associated with the data service may be assigned to another quality class.

2. Description of the Prior Art

Say, for example, a subscriber would like to use data services in a packet-switching network; e.g., the Internet. Normally, the subscriber gains access to the packet-switching network by first using his/her subscriber terminal, or a personal computer, to dial into the packet-switching network either directly or indirectly via a private branch exchange or local exchange at an access node. The subscriber then sets up a connection to a network node providing data services in the packet-switching network, e.g. to a computer of a service provider, and requests data services from such a network node by, for example, using an application program available on his personal computer.

Corresponding conditions likewise apply to a private packet-switching network; e.g., to a company network. In this case, the access node to the private packet-switching network is usually integrated into the subscriber terminal or into the private branch exchange. Such a private packet-switching network can also have access to another private or public packet-switching network, such as to a company network or to the Internet. Accordingly, a network node providing data services may be situated not only in the public packet-switching network but also in a private packet-switching network.

In such a packet-switching network, such as the Internet, the data transmission is normally connectionless, i.e. the data packets having identical origin and destination addresses are transported independently of one another, so that neither the order nor delivery of the data packets at the destination node is guaranteed (OSI layer 3 protocol). It is, therefore, also not possible to assure a quality grade for the transmission of data packets between origin and destination nodes, such as a certain bandwidth, delay times, a particular throughput and a low packet loss rate.

Video transmission services (e.g., Video on Demand) and various telephone services (e.g., Voice over IP), in particular, require secure and rapid data transmission on the Internet with an assured constant quality grade. Data services requested by a subscriber, such as Video on Demand, Voice over IP or videoconference circuits require secure and rapid data transmission with an assured and, at the same times stable quality grade.

With respect to the Internet, an approach is currently being discussed within the sphere of the concept of "Differentiated Services", which guarantees the demanded bandwidth and shorter delay times for transmission of the data packets associated with such data services.

By way of example, an 'Internet draft' document "Differentiated Services Model and Definitions" written by K. Nichols and S. Blake, published by the Internet Engineering Task Force in February 1998, proposes a method which permits accelerated transmission of data packets from an origin node to a destination node. For data packets associated with a data service which demands a high transmission bandwidth, particular bits of the 'TOS byte' are respectively set in the header part of such data packets. On the basis of the bits which have been set in the TOS byte, the data packets are assigned to different quality classes. Depending on the assigned quality class, the data packets are possibly given preferential treatment in the intermediate nodes. As such, accelerated forwarding, that is to say virtually without delay, to the next intermediate or network node is attempted. An example of a quality class with low priority is the "Best Effort" class customary on the Internet. According to this, the data packets are handled as soon as possible, and as many as possible from one data service are handled. An example of a quality class having very high priority is the "Premium" class, which is distinguished by extremely short delay times and is, therefore, more or less comparable to a virtual connection.

Additional comments relating to the method explained above can be found in other Internet draft documents "An Architecture for Differentiated Services", written by D. Blake, S. Blake, M. Carlson, E. Davies, Zh. Wang, W. Weiss, published by the Internet Engineering Task Force in May 1998, and "A Framework for Differentiated Services", written by Y. Bernet, J. Binder, S. Blake, M. Carlson, S. Keshav, E. Davies, B. Ohlman, D. Verma, Zh. Wang, W. Weiss, published by the Internet Engineering Task Force in October 1998.

A significant disadvantage of the method outlined above is that preferential treatment permits data services whose data packets have been assigned to a particular quality class to be assured only of a quality grade which is dependent on the network utilization level.

This problem becomes particularly evident if a large number of data services are requested by subscribers who require a constant or stable and, at the same time, high quality grade for the delay and the transmission bandwidth. In this case, it is no longer possible to provide each data service with the demanded quality grade.

A quite different approach, which has its origin in conjunction with multimedia applications in ATM networks (Asynchronous Transfer Mode), in which virtual connections are set up in a known manner between subscribers and the network nodes providing data services, is to match the transmission bandwidth of multimedia applications to the network utilization level.

For transmission to connectionless packet-switching networks, a publication by I. Busse, B. Deffner and H. Schulzrinne entitled "Dynamic QoS Control of Multimedia Applications based on RTP", First International Workshop on High Speed Networks and Open Distributed Platforms, St. Petersburg (Russia), June 1995 presents a method in which, for multimedia applications, the transmitter matches the transmission bandwidth dynamically on the basis of the transmission quality obtained at the receiver. In particular, the transmission bandwidth is reduced if, with a high network utilization level, a high packet loss rate at the receiver has been reported to the transmitter. To this end, the 'RTP/RTCP' protocol is used, which delivers to the transmitter an acknowledgement about the transmission quality obtained at the receiver.

A significant disadvantage of this method is, accordingly, that such data services cannot be assured of a stable transmission quality for a high network utilization level. Instead of guaranteeing a constant or stable transmission bandwidth, the transmission bandwidth is more readily reduced for a high network utilization level. As such, the data service is received with poor quality. This can even result in data transmission needing to be terminated on account of the quality being too poor for the data service.

An object of the present invention is to develop a method such that, when a requested data service is transmitted, the stable quality grade demanded by the data service is provided.

SUMMARY OF THE INVENTION

According to the present invention, therefore, a stable quality grade for such data services is provided by virtue of the fact that, during the transmission of data packets which are associated with such a data service and are assigned to a quality class with the aim of possible preferential treatment, these data packets are possibly assigned to another quality class, which is expected to provide the quality grade demanded by the data service, on the basis of a result of a comparison between an acknowledged quality grade which actually exists in the packet-switching network and the demanded quality grade. In other words: the transmitter or at least one intermediate node in the packet-switching network establishes the quality of the transmission on the basis of acknowledgements which indicate the quality grade and compares the acknowledged quality grade with the quality grade demanded by the data service.

If the acknowledged quality grade is below the demanded quality grade, the transmitter or an intermediate node will assign the data packets associated with the data service to a higher quality class, of which the quality grade demanded by the data service is expected. If the acknowledged quality grade has virtually the same or a higher value than the quality grade demanded by the data service, then the transmitter or the intermediate node possibly assigns the data packets associated with the data service to a low quality class, if the expectation of a constant quality grade is high. Otherwise, the quality class assigned at the start of data transmission is retained.

As a result, particularly at a high utilization level, the dynamic matching of the quality class on the basis of the network conditions prevents the quality grade from dropping during data transmission, and hence keeps the quality grade stable. In addition, the method according to the present invention allows resource consumption in the packet-switching network to be controlled.

One embodiment of the present invention affords, in addition to the various quality classes, a number of priority classes within a quality class. Accordingly, the data packets associated with a data service are first assigned to another priority class within a quality class before they are assigned to another quality class. This provides an additional option for correcting the acknowledged quality grade to the quality grade demanded by the data service, without needing to change the quality class.

In accordance with one advantageous embodiment of the present invention, during a change to another quality class, the data packets associated with a data service are first assigned to the lowest priority class within the newly assigned quality class. This makes it possible to prevent the transmission of data packets assigned to the other quality class from being impaired as a result of the change.

Another embodiment of the present invention provides that, for the comparison between the acknowledged quality grade and the quality grade demanded by the data service, at least one upper threshold value and at least one lower threshold value are introduced. Thus, if at least one upper threshold value is exceeded by the difference between the demanded quality grade and the acknowledged quality grade, this results in the data packets associated with the data service being assigned to a higher quality class or possibly to a higher priority class. If at least one lower threshold value is undershot by the difference between the demanded quality grade and the acknowledged quality grade, the data packets are assigned to a low quality class or possibly to a low priority class. This has the advantage of additional stabilization of the quality grade during data transmission owing to the fact that a constant change between the quality classes or the priority classes is avoided.

Another advantageous embodiment of the present invention uses not only the quality of the transmission of such data packets but also a further comparison parameter; namely, the network utilization level. If the acknowledged quality grade and the quality grade demanded by the data service have virtually the same valve, the assignment of the data packets associated with the data service to a quality class is additionally dependent on the network utilization level. With a high network utilization level, the data packets are more readily assigned to a high quality class or possibly to a high priority class, and with a low network utilization level, these data packets are more readily assigned to a low quality class or possibly to a low priority class. The additional comparison parameter increases the likelihood of the quality grade which is to be expected being reached or at least retained when the quality class changes.

Another embodiment of the present invention relates to an advantageous implementation with respect to the handling, on the basis of the associated quality class, of such data packets in an intermediate node. Before such data packets are forwarded, they are temporarily stored in a queue which is based on their quality class.

In accordance with another embodiment of the present invention, the priority classes possibly available in a quality class are advantageously implemented such that the data packets arriving at an intermediate node and associated with a data service are temporarily stored in a queue before being forwarded and are characterized using a marker which is based on their priority class and can be used to discard the characterized data packets if the queue overflows.

Additional features and advantages of the present invention are described in, and will be apparent from, the following Detailed Description of the Preferred Embodiments and the Drawings.

DESCRIPTION OF THE DRAWINGS

FIG. 1 shows a packet-switching network to which the method according to the present invention can be applied.

DETAILED DESCRIPTION OF THE PREFERRED EMBODIMENTS

Referring to FIG. 1, a subscriber terminal TLN is connected to the packet-switching network PN, e.g. the Internet, via an access node ZK. The indicated packet-switching network PN also could be a private packet-switching network, e.g. a company network. In the case of a private packet-switching network, the access node ZK is usually integrated into the subscriber terminal or into the private branch exchange. Such a private packet-switching network can also have a point of access to another private or public packet-switching network; e.g., to a company network or to the Internet. The packet-switching network PN in FIG. 1 can then be regarded as a communication network comprising all the private and public packet-switching networks.

FIG. 1 also shows a computer DK, e.g. of a service provider, which provides subscribers with data services, such as Video on Demand or Voice over IP, and is situated in the packet-switching network PN. The intermediate nodes ZW1 to ZW4 connected in between the computer DK and the access node ZK indicate that there can be a number of connection options between the computer DK and the access node ZK. Thus, on the Internet, for example, as already mentioned in the introduction, it is customary for data packets to get to their destination independently of one another on different paths.

In the example, a subscriber uses his/her subscriber terminal TLN, e.g. a personal computer, to dial into the packet-switching network PN via the connection to the access node ZK, and uses an application program provided on his subscriber terminal to set up a connection to a computer DK, providing data services, of a service provider, e.g. via the intermediate nodes ZW1 to ZW4. The subscriber requests a video transmission service, for example, which requires a transmission bandwidth of 100 kbit/s. Accordingly, the data packets associated with the video transmission service are assigned to a mean quality class, for example, by setting a particular bit pattern in the 'TOS byte' of such a data packet. Assuming that there are quality classes of A (e.g. premium), B (e.g. normal) and C (e.g. best effort), with A distinguishing the highest class, then the data packets associated with the video transmission service are assigned to the class B in the example.

Ideally, the quality classes are subdivided further into priority classes, e.g. 1 (low) to 8 (high). By way of example, the data packets associated with the video transmission service are assigned to the priority class 4, with the priority class likewise being able to be characterized in the 'TOS byte' of such data packets.

At the start of transmission of the video transmission service, the data packets are thus sent with the quality class B and the priority class 4. During transmission, an intermediate node, e.g. ZW1, or the receiver, e.g. ZK or TLN, acknowledges to the transmitter, in the example the computer of a service provider DK, the quality grade, such as the bandwidth, delay times to the network node and the packet loss rate for the transmission, using a protocol, e.g. the RTP/RTCP protocol mentioned in the introduction, and then compares the acknowledged quality grade with the demanded quality grade. Preferably, at least one upper limit and at least one lower limit are stipulated for the comparison. If the limits are exceeded or undershot by the difference between the demanded quality grade (NOMINAL value) and the acknowledged quality grade (ACTUAL value), for example for the transmission bandwidth, a change to another quality class or possibly priority class is triggered. In this case, the ACTUAL value can be determined, by way of example, by the average value with, if appropriate, a stipulated permissible discrepancy (e.g., +/−5%) from quality grade values acknowledged cyclically over a particular period of time (e.g., 1 second). Accordingly, the levels for the difference between the NOMINAL value and the ACTUAL value can be set as triggers for a change to a higher/lower quality class or priority class such that, by way of example, the following rules are produced:

1. If a positive difference between NOMINAL and ACTUAL value has a value of more than 128 kbit/s, then a change to the highest quality class A is made.
2. A corresponding negative difference of less than −128 kbit/s triggers a change to the lowest quality class C.
3. With a positive difference of more than 64 kbit/s, there is a change to the next highest quality class.
4. With a corresponding negative difference of less than −64 kbit/s, there is a change to the next lowest quality class.
5. If the positive difference constitutes less than 64 kbit/s, or the negative difference constitutes more than −64 kbit/s, then the quality class is retained.
6. A positive or negative difference of more than 8 kbit/s or less than −8 kbit/s results in a change to the next highest or lowest priority class (max. 8 priority classes).

Similar rules can be stipulated for other quality grade features than for the transmission bandwidth, such as for the delay time, the packet loss rate and the throughput. Particularly with a voice data service such as Voice over IP, the transmission bandwidth would be less of a crucial factor for a change of quality class than the delay time and possibly the packet loss rate.

By way of example, a transmission bandwidth of 76 kbit/s obtained at the receiver, e.g. TLN, is acknowledged to the transmitter, e.g. DK, instead of the demanded transmission bandwidth of 100 kbit/s. The transmitter then rearranges the data packets associated with the video transmission service from the priority class 4 into the priority class 5; for example, on the basis of the rules 5 and 6 indicated above. If the transmission bandwidth of 100 kbit/s is now detected, the priority class can be retained. Otherwise, reassignment to a higher priority class is repeated until the demanded transmission bandwidth is reached. Under the circumstance in which the highest priority class in the quality class has already been assigned and only a transmission bandwidth of, by way of example, 85 kbit/s could be achieved, it is appropriate to assign the data packets associated with the video transmission service to the next highest quality class, e.g. A. Preferably, these data packets in the next highest quality class are then first assigned to the lowest priority class, e.g. 1, so as not to impair the quality of the transmission of data packets associated with other data services within this quality class. If the influence on the transmission quality is too great, the data packets associated with the video transmission service can, if appropriate, be removed from this quality class and assigned to the original quality class again.

Advantageously, the network utilization level can also be used to determine the quality or priority class. Thus, in addition to the transmission bandwidth obtained at the receiver, the delay times or fluctuations in the delays can also be acknowledged. Accordingly, after repeated assignment to a higher priority class and with a subsequently acknowledged short delay time, it would be possible to try to assign the data packets associated with the video transmission service to a lower priority class or possibly to a lower quality class again. In the case of a long delay time, which indicates a high network utilization level, the data packets associated with the video transmission service are more readily assigned to even higher priority classes or are predominantly assigned to a higher quality class. In addition, the data packets associated with other data services in the packet-switching network could be prevented from changing to a higher priority class or quality class.

Expediently, the quality classes are implemented in the form of separate queues in the network nodes (intermediate nodes, e.g. ZW1 to ZW4) of the packet-switching network. The data packets arriving at the intermediate nodes are temporarily stored in a queue which is based on their quality class before being forwarded. The priority classes are usefully produced by a 'drop level' mechanism. That is, the data packets arriving at an intermediate node are provided with a marker which is based on their priority class and are temporarily stored in a queue which is based on their quality class. If the queue overflows, the data packets associated with a low priority class are discarded first.

Although the present invention has been described with reference to specific embodiments, those of skill in the art will recognize that changes may be made thereto without departing from the spirit and scope of the invention as set forth in the hereafter appended claims.

What is claimed is:

1. A method for providing a stable quality grade for data services within a packet-switching network which has at least one access node for connecting at least one of at least one subscriber terminal and at least one private branch exchange having at least one connected subscriber terminal, and has at least one of a plurality of network nodes for providing data services, the method comprising the steps of:

assigning data packets, which are respectively associated with the data service, at a start of transmission between the at least one network node providing the data service and one of a subscriber terminal and an access node connected to the subscriber terminal, to a quality class whereupon the data packets are handled within intermediate nodes which forward the data packets;

establishing, via at least one of the at least one network node and at least one intermediate node, and during transmission of the data packets, a quality of the transmission based on acknowledgements indicating a quality grade, and comparing the quality of the transmission with a quality grade demanded by the data service; and assigning the data packets associated with the data service, depending on a result of the comparison, to another quality class of which the quality grade demanded by the data service is expected.

2. The method for providing a stable quality grade for data services within a packet-switching network as claimed in claim 1, wherein a quality class includes a plurality of subordinate priority classes, and the data packets associated with the data service are first assigned to another priority class within a quality class before assignment to another quality class occurs.

3. The method for providing a stable quality grade for data services within a packet-switching network as claimed in claim 2, wherein, if the data packets associated with the data service are assigned to another quality class, the data packets are first assigned to a lowest priority class.

4. The method for providing a stable quality grade for data services within a packet-switching network as claimed in claim 2, wherein at least one upper and at least one lower threshold value is stipulated for the comparison between the acknowledged quality grade and the quality grade demanded by the data service and, if the at least one upper threshold value is exceeded by the difference between the demanded quality grade and the acknowledged quality grade, the data packets associated with the data service are assigned to one of a higher quality class and a higher priority class and, if the at least one lower threshold value is undershot by the difference between the demanded quality grade and the acknowledged quality grade, the data packets are assigned to one of a low quality class and a low priority class.

5. The method for providing a stable quality grade for data services within a packet-switching network as claimed in claim 2, wherein, besides the quality of the transmission of the data packets, a network utilization level is also acknowledged and, if the acknowledged quality grade and the quality grade demanded by the data service have a substantially same value and the network utilization level is high, the data packets are preferably assigned to one of a high quality class and a high priority class and, if the acknowledged quality grade and the quality grade demanded by the data service have a substantially same value and the network utilization level is low, the data packets are preferably assigned to one of a low quality class and a low priority class.

6. The method for providing a stable quality grade for data services within a packet-switching network as claimed in claim 2, wherein the data packets arriving at an intermediate node and associated with the data service are temporarily stored in a queue, which is based on the quality class of the data packets, before the data packets are forwarded.

7. The method for providing a stable quality grade for data services within a packet-switching network as claimed in claim 2, wherein the data packets arriving at an intermediate node and associated with the data service are temporarily stored in a queue before being forwarded and are characterized using a marker which is based on a priority class of the data packets and which can be used to discard the characterized data packets if the queue overflows.

* * * * *